(12) United States Patent
Mancuso, Jr.

(10) Patent No.: US 8,534,632 B1
(45) Date of Patent: Sep. 17, 2013

(54) BUCKET STABILIZING TACKLE BOX SYSTEM

(76) Inventor: Robert Mancuso, Jr., Clio, AL (US)

( * ) Notice: Subject to any disclaimer, the term of this patent is extended or adjusted under 35 U.S.C. 154(b) by 136 days.

(21) Appl. No.: 13/326,812

(22) Filed: Dec. 15, 2011

(51) Int. Cl.
*A47B 91/00* (2006.01)

(52) U.S. Cl.
USPC ........ 248/346.5; 248/146; 248/154; 248/500; 208/564

(58) Field of Classification Search
USPC .............. 248/346.5, 146, 154, 311.2, 519, 248/680, 500, 499, 505, 510; 206/373, 446, 206/564; 220/737
See application file for complete search history.

(56) References Cited

U.S. PATENT DOCUMENTS

| | | | |
|---|---|---|---|
| 2,545,320 A * | 3/1951 | Tilson et al. | 248/346.03 |
| 3,028,702 A * | 4/1962 | St Cyr | 215/395 |
| 4,084,701 A * | 4/1978 | White | 211/81 |
| D260,278 S * | 8/1981 | Bradford | D22/136 |
| D269,571 S * | 7/1983 | Geshwind | D11/130.1 |
| 4,826,007 A | 5/1989 | Skeie | |
| 4,905,945 A * | 3/1990 | Peterson | 248/146 |
| 4,907,712 A * | 3/1990 | Stempin | 220/630 |
| 4,932,621 A * | 6/1990 | Kowk | 248/146 |
| 5,125,184 A * | 6/1992 | Anderson | 47/81 |
| D364,831 S * | 12/1995 | Fillipp | D11/130.1 |
| D383,271 S | 9/1997 | Eshelman | |
| 5,743,505 A * | 4/1998 | Sofy | 248/346.01 |
| 5,845,890 A * | 12/1998 | Earsley et al. | 248/516 |
| 6,286,804 B1 * | 9/2001 | Avinger et al. | 248/523 |
| 6,361,001 B1 * | 3/2002 | Durand | 248/146 |
| 6,464,184 B1 | 10/2002 | Lytle | |
| 7,018,090 B2 | 3/2006 | Moore | |
| D523,518 S * | 6/2006 | Moldenhauer | D23/206 |
| 7,258,312 B2 | 8/2007 | Grosse | |
| D575,581 S * | 8/2008 | Harris | D7/396.6 |
| D579,514 S * | 10/2008 | Kelps | D23/206 |
| 7,494,103 B1 | 2/2009 | Huebner | |
| D593,270 S | 5/2009 | Taylor | |
| D593,364 S * | 6/2009 | Harris | D7/505 |
| 7,556,230 B2 * | 7/2009 | Sarullo | 248/311.2 |
| 7,644,819 B2 * | 1/2010 | Gill et al. | 206/446 |
| 7,708,242 B1 | 5/2010 | Petrashune et al. | |
| D630,704 S * | 1/2011 | Kochanski | D23/206 |
| D636,944 S * | 4/2011 | Anderson et al. | D30/129 |
| D641,064 S * | 7/2011 | Cogswell et al. | D23/206 |
| D648,904 S * | 11/2011 | Tedaldi et al. | D30/129 |
| 8,091,853 B2 * | 1/2012 | Clores | 248/523 |
| D658,267 S * | 4/2012 | Brockington et al. | D23/206 |
| 8,215,517 B2 * | 7/2012 | Chohfi et al. | 220/581 |
| D676,353 S * | 2/2013 | Bycraft | D11/130.1 |
| D677,128 S * | 3/2013 | Roesser | D7/625 |
| 2004/0016855 A1 * | 1/2004 | Berry et al. | 248/146 |

(Continued)

*Primary Examiner* — Terrell McKinnon
*Assistant Examiner* — Daniel J Breslin

(57) ABSTRACT

A bucket stabilizing system having a base with a top surface, a side wall, a bottom surface, and an inner cavity which can be used for storage, the top surface has a diameter smaller than that of the bottom surface, a lip extends outwardly from the bottom surface past the side wall; an inner channel for accepting a bucket in a center of the base extending from the top surface toward the bottom surface; at least one access hole in the side wall for providing access to the inner cavity; a first and second rope guide notch opposite from each other at an intersection of the top surface which allow passage of rope into the inner cavity; and a first and a second tie-off hole opposite from each other at an intersection of the top surface and the side wall which allow passage of rope out of the inner cavity.

9 Claims, 4 Drawing Sheets

Side View In Use

(56) References Cited

U.S. PATENT DOCUMENTS

| | | |
|---|---|---|
| 2005/0045780 A1* | 3/2005 | Forshee et al. ................ 248/146 |
| 2007/0076519 A1 | 4/2007 | Kesling |
| 2007/0187564 A1* | 8/2007 | McGuire .................... 248/346.5 |
| 2007/0252051 A1 | 11/2007 | Kuipers |
| 2008/0042035 A1* | 2/2008 | Elwood .................... 248/346.03 |
| 2009/0126641 A1* | 5/2009 | Anderson et al. ............ 119/61.5 |
| 2010/0077963 A1* | 4/2010 | Lipscomb et al. ............. 119/54 |
| 2011/0140412 A1* | 6/2011 | Manser et al. ................ 285/192 |

* cited by examiner

Isometric View

Top View

Side View In Use

Bottom View

Alternate Top View

BUCKET STABILIZING TACKLE BOX SYSTEM

FIELD OF THE INVENTION

The present invention is directed to system (e.g., a base) for stabilizing buckets and providing storage like a tackle box.

BACKGROUND OF THE INVENTION

Minnow buckets and bait buckets can be unstable and tip over easily. The present invention features a bucket stabilizing tackle box system. The system of the present invention helps prevent a minnow bucket or a bait bucket from tipping (or spilling). The system also provides a tackle box so there is no need for a separate tackle box. The system of the present invention may be constructed in a variety of shapes and designs and is not limited to the shapes and designs described herein.

SUMMARY

The present invention features a bucket stabilizing tackle box system. In some embodiments, the bucket stabilizing system for stabilizing a bucket and providing storage space, comprises a base having a top surface, a side wall, a bottom surface, and an inner cavity, the top surface has a diameter smaller than that of the bottom surface, a lip extends outwardly from the bottom surface of the base past the side wall; an inner channel disposed in a center of the base extending from the top surface of the base toward the bottom surface of the base, the inner channel is adapted to accept a bucket; at least one access hole disposed in the side wall of the base for providing access to the inner cavity of the base, the inner cavity can be used for storage; a first rope guide notch disposed at an intersection of the top surface and the inner channel of the base, and a second rope guide notch disposed at an intersection of the top surface and the inner channel of the base opposite the first rope guide notch, the rope guide notches allow passage of rope into the inner cavity of the base; and a first tie-off hole disposed at an intersection of the top surface and the side wall, and a second tie-off hole disposed at an intersection of the top surface and the side wall opposite the first tie-off hole, the tie-off holes allow passage of rope out of the inner cavity of the base.

In some embodiments, the system further comprises a gripping component disposed on the bottom surface of the base to help prevent the base from slipping.

In some embodiments, the system further comprises at least one slot disposed in the lip, the slot is open on an outer edge of the lip. In some embodiments, the slots are arranged symmetrically around the lip.

In some embodiments, the system further comprises a keyhole disposed in the lip. In some embodiments, the system further comprises a pilot hole disposed in the lip.

In some embodiments, the system further comprises a net notch disposed in the inner channel of the base extending from the top surface of the base toward the bottom surface of the base.

In some embodiments, the bottom surface is removably attached to the side wall and lip of the base.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
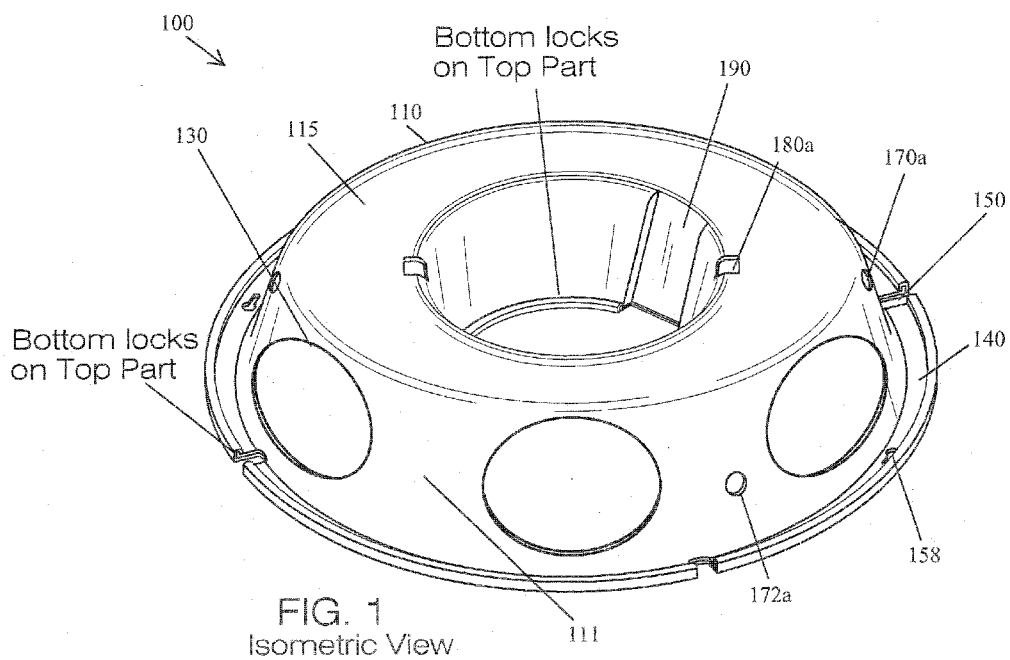
FIG. 1 is a perspective view of the system of the present invention.
Figure 2:
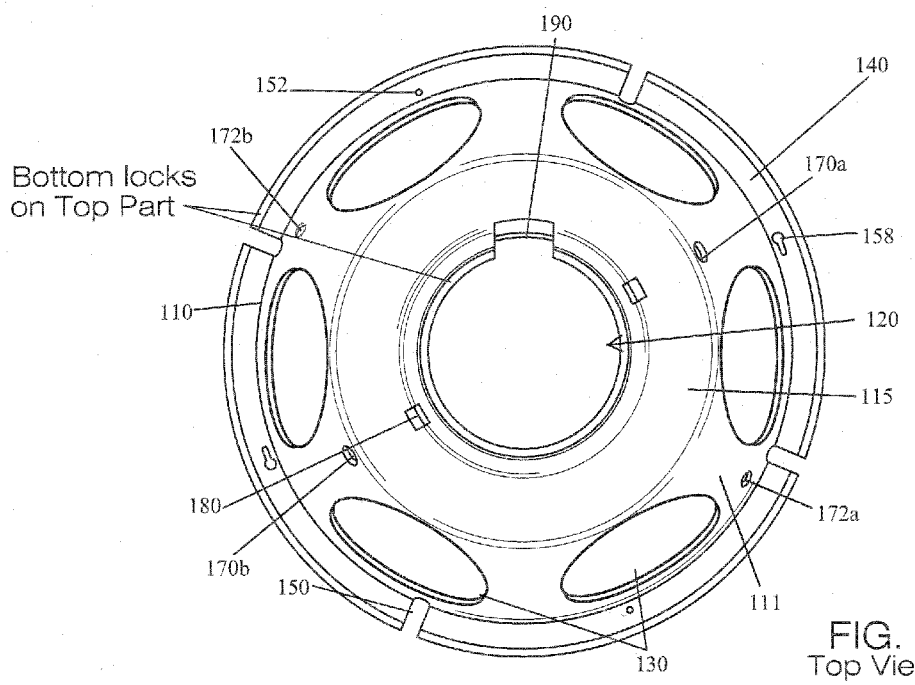
FIG. 2 is a top view of the system of the present invention.
Figure 3:
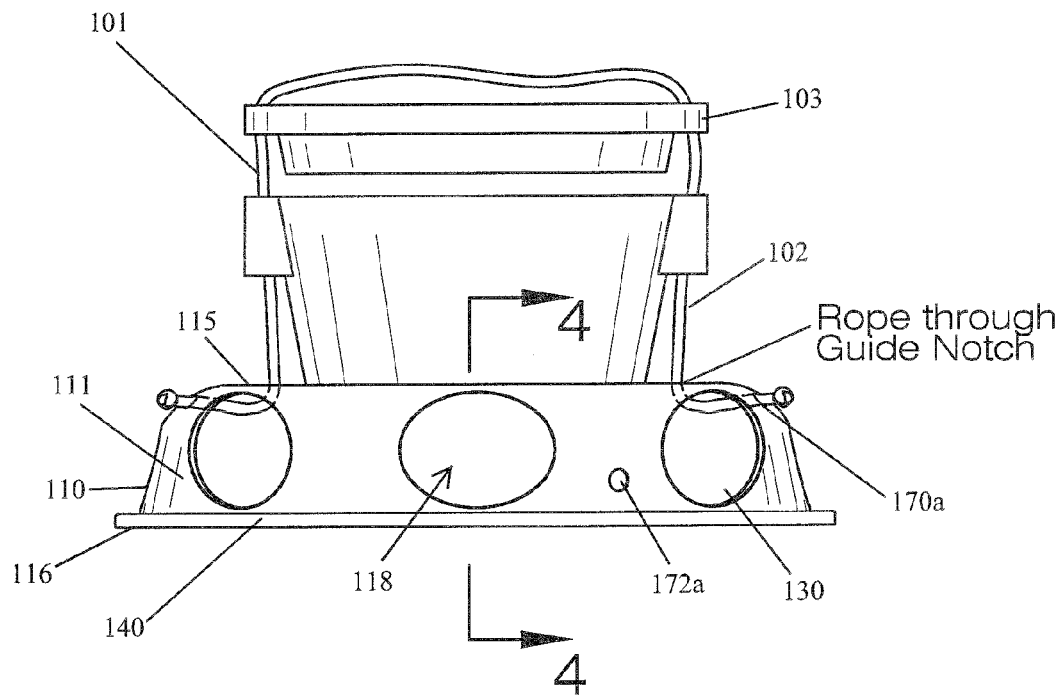
FIG. 3 is a side in-use view of the system of the present invention.

Referring now to FIG. 1-6, the present invention features a bucket stabilizing tackle box system 100 for stabilizing buckets such as minnow buckets and bait buckets. The system 100 of the present invention may be constructed in a variety of shapes, sizes, and designs. The system 100 comprises a base wherein the base does not tip (e.g., the bottom surface has a diameter or width larger than that of the top surface). The base can accept a bucket and help prevent the bucket from tipping. The base has compartments to function as a tackle box.

As shown in FIG. 1-6, the system 100 comprises a base 110 having a top surface 115, a side wall 111, a bottom surface 116, and an inner cavity. The top surface 115 and the bottom surface 116 are generally round, and the top surface 115 has a diameter smaller than that of the bottom surface 116. A lip 140 extends outwardly from the bottom surface 116 of the base 110 past the side wall 111.

In some embodiments, one or more slots 150 are disposed in the lip 140 (e.g., drain slots). The slots are open on the outer edge of the lip 140. In some embodiments, the slots 150 are arranged symmetrically around the lip 140. In some embodiments, four slots 150 are disposed in the lip 140. In some embodiments, one or more keyholes 158 are disposed in the lip 140. Keyholes are well known to one of ordinary skill in the art. In some embodiments, two keyholes 158 are disposed in the lip 140 and are arranged opposite one another. In some embodiments, one or more pilot holes 152 are disposed in the lip 140. In some embodiments, two pilot holes 152 are disposed in the lip 140 and are arranged opposite one another.

An inner channel 120 is disposed in the center of the base 110 and extends from the top surface 115 of the base 110 to the bottom surface 116 of the base 110. The inner channel 120 is adapted to accept a bucket 101. The base 110 is adapted to fit around standard sized polystyrene minnow buckets, which are well known to one of ordinary skill in the art. However, the present invention is not limited to that size.

At least one access hole 130 is disposed in the side wall 111 of the base 110. The access hole 130 provides access to the inner cavity 118 of the base 110. Items (e.g., fishing hooks, weights, lures, etc.) can be stored in the inner cavity 118 of the base 110, allowing the base 110 to function like a tackle box. Tackle boxes are well known to one of ordinary skill in the art. The access holes 130 may be of various shapes and sizes, for example see FIG. 1 and FIG. 6. For example, in some embodiments, the access holes 130 are oblong.

Figure 5:
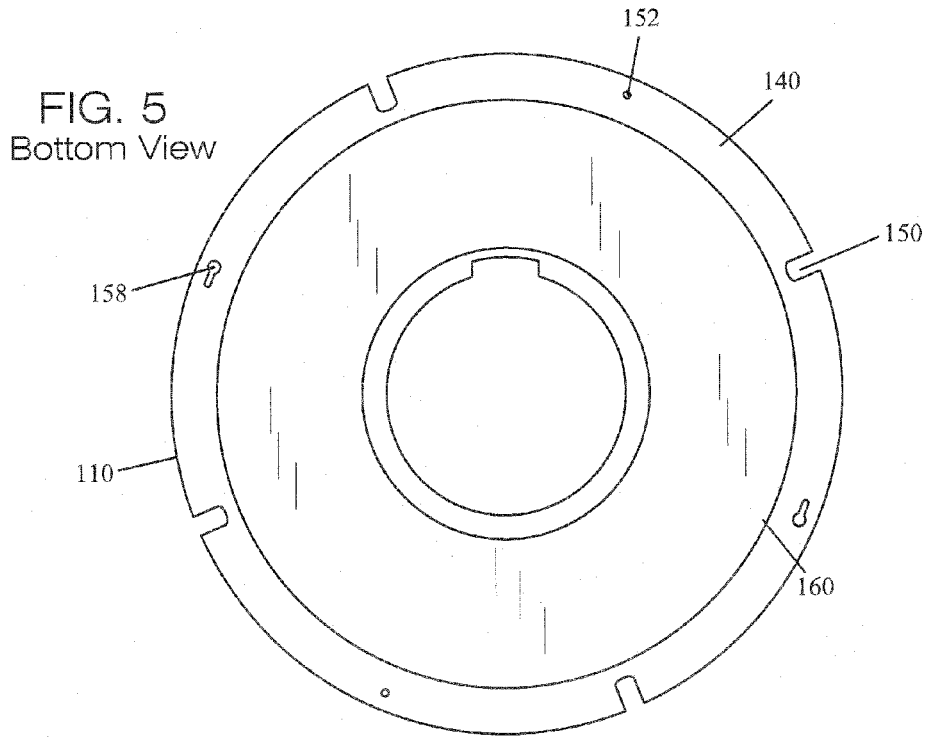
FIG. 5 is a bottom view of the system of the present invention.
Figure 6:
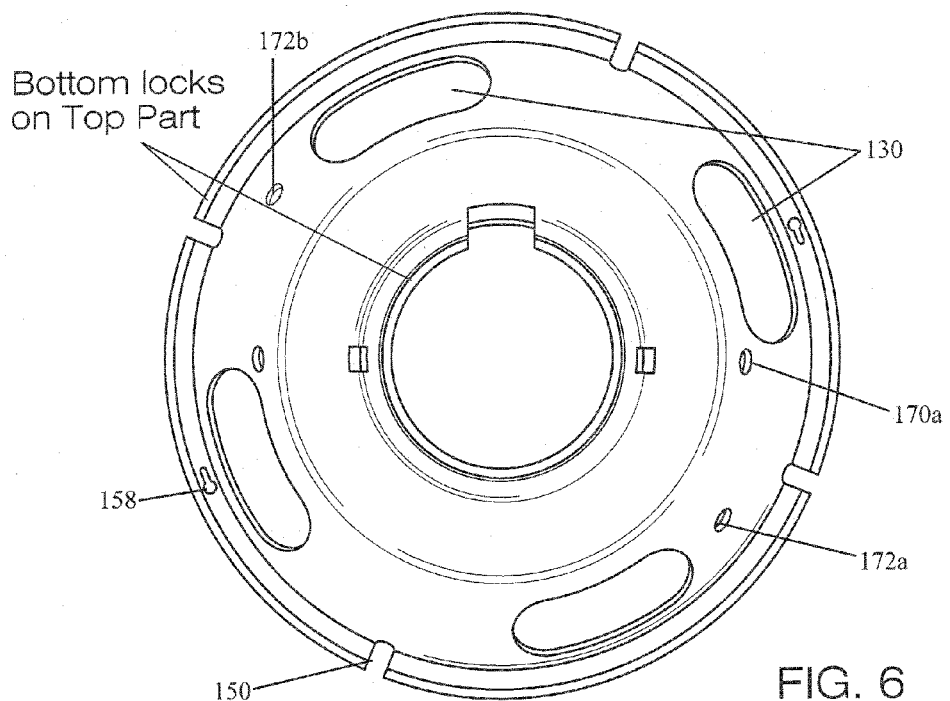
FIG. 6 is an alternate top view of the system of the present invention.

As shown in FIG. 5, in some embodiments, a gripping component 160 (e.g., rubber, plastic) is disposed on the bottom surface 116 of the base 110 to help prevent the base 110 from slipping.

A first rope guide notch 180a is disposed in the base 110 at the intersection of the top surface 115 and the inner channel 120 of the base 110, and a second rope guide notch 180b is disposed in the base 110 at the intersection of the top surface 115 and the inner channel 120 of the base 110 opposite the first rope guide notch 180a. The rope guide notches 180 allow passage of rope 102. For example, rope 102 from the bucket 101 (e.g., the bucket lid 103) can be fed through the rope guide notches 180 and into the inner cavity 118 of the base 110.

A first tie-off hole 170a is disposed in the base 110 at the intersection of the top surface 115 and the side wall 111, and a second tie-off hole 170b is disposed in the base 110 at the intersection of the top surface 115 and the side wall 111 opposite the first tie-off hole 170a. The tie-off holes 170 allow passage of rope 102. For example, rope 102 from the bucket 101 can be fed through the rope guide notches 180, through the inner cavity 118 of the base 110, and further through the tie-off holes 170. A user can tie knots in the rope 102 after it has been fed out of the tie-off holes 170.

A first tie-down hole 172a is disposed in the side wall 111 of the base 110 at or near the bottom surface 116 or lip 140, and a second tie-down hole 172b is disposed in the side wall 111 of the base 110 at or near the bottom surface 116 or lip 140 opposite the first tie-down hole 172a. The tie-down holes 172 allow passage of rope 102. For example, rope 102 can be fed from the inner cavity 118 of the base 110 through the tie-down holes 172. In some embodiments, the tie-down holes 172 and tie-off holes 170 are arranged symmetrically around the base 110. In some embodiments, the tie-down holes 172 and tie-off holes 170 are arranged asymmetrically around the base 110.

In some embodiments, a net notch 190 (e.g., indentation) is disposed in the inner channel 120 of the base 110 extending from the top surface 115 of the base 110 to the bottom surface 116 of the base 110.

Figure 4:
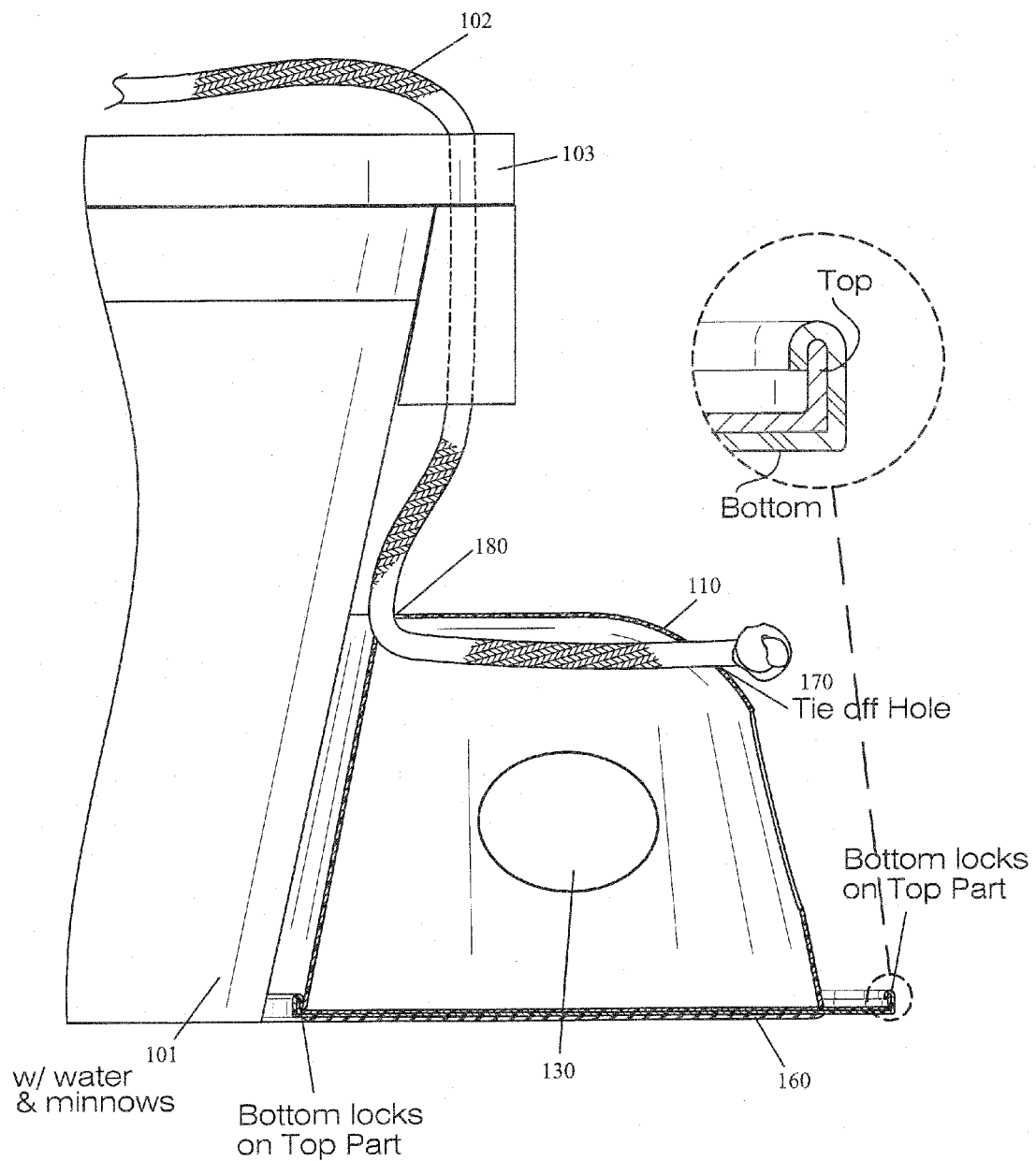
FIG. 4 is a cross-sectional view of the system of the present invention.

As shown in FIG. 4, in some embodiments, the bottom surface 116 is removably attached to the side wall 111/lip 140 of the base 110. For example, the lip 140 has a top portion and bottom portion, the bottom portion being an extension of the bottom surface 116 of the base 110. The bottom portion of the lip 140 can removably engage the top portion of the lip 140 via an attachment means (e.g., a snap mechanism) to secure the bottom surface 116 of the base 110 to the side wall 111 and top portion of the lip 140. In the inner channel 120, the bottom surface 116 of the base 110 can engage the side wall 111 via an attachment means (e.g., a snap mechanism).

The present invention is not limited to use with bait buckets. For example, in some embodiments, the system 100 is used for paint cans. In some embodiments, the net notch 190 can be used to hold paintbrushes.

In some embodiments, the system 100 further comprises a top tray. Rope handle holes may act as drains for the top tray and base 110. In some embodiments, the system 100 further comprises a top box. In some embodiments, the top box comprises three handle holes. In some embodiments, the top area of the base 110 is clear (unobstructed) so as to allow for the top box or top tray to stack atop the base 110. In some embodiments, the system 100 with the base 110 is introduced to be sold, then the top tray or the top box is introduced to be sold. In some embodiments, combinations may be provided (e.g., later), for example a combination with the base 110 and top tray and/or a combination with the base 110 and the top box.

In some embodiments, the system is constructed as a toy, e.g., a miniature version. In some embodiments, the system is constructed to accommodate paint cans instead of minnow buckets.

The disclosures of the following U.S. Patents are incorporated in their entirety by reference herein: U.S. Pat. No. 4,826,007; U.S. Design Pat. No. D383271; U.S. Pat. No. 6,464,184; U.S. Pat. No. 7,018,090; U.S. Pat. No. 7,258,312; U.S. Pat. No. 7,494,103; U.S. Design Pat. No. D593270; U.S. Pat. No. 7,708,242; U.S. Patent Application No. 2007/0076519; U.S. Patent Application No. 2007/0252051.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A bucket stabilizing system (100) for stabilizing a bucket and providing storage space, said system (100) comprising:
 (a) a base (110) having a top surface (115), a side wall (111), a bottom surface (116), and an inner cavity, the top surface (115) has a diameter smaller than that of the bottom surface (118), a lip (140) extends outwardly from the bottom surface (116) of the base (110) past the side wall (111);
 (b) an inner channel (120) disposed in a center of the base (110) extending from the top surface (115) of the base (110) toward the bottom surface (116) of the base (110), the inner channel (120) is adapted to accept a bucket (101);
 (c) at least one access hole (130) disposed in the side wall (111) of the base (t 10) for providing access to the inner cavity (118) of the base (110), the inner cavity (118) is used for storage:
 (d) a first rope guide notch (180a) disposed at an intersection of the top surface (115) and the inner channel (120) of the base (110), and a second rope guide notch (!80b) disposed at an intersection of the top surface (115) and the inner channel (120) of the base (110) opposite the first rope guide notch (180a), the rope guide notches (180) allow passage of rope (102) into the inner cavity (118) of the base (110);
 (e) a first tie-off hole (170a) disposed at an intersection of the top surface (115) and the side wall (111), and a second tie-off hole (170b) disposed at an intersection of the top surface (115) and the side wall (111) opposite the first tie-off hole (170a), the tie-off holes (170) allow passage of rope (102) out of the inner cavity (118) of the base (110); and
 (f) wherein the bottom surface (116) is removably attached to the side wall (111) and lip (140) of the base (110).

2. The system (100) of claim 1 further comprising a gripping component (160) disposed on the bottom surface (116) of the base (110) to help prevent the base (110) from slipping.

3. The system (100) of claim 1 further comprising at least one slot (150) disposed in the lip (140), the slot (150) is open on an outer edge of the lip (140).

4. The system (100) of claim 3, wherein the one or more slots (150) are arranged symmetrically around the lip (140).

5. The system (100) of claim 1 further comprising a keyhole (158) disposed in the lip (140).

6. The system (100) of claim 1 further comprising a pilot hole (152) disposed in the lip (140).

7. The system (100) of claim 1 further comprising a net notch (190) disposed in the inner channel (120) of the base (110) extending from the top surface (115) of the base (110) toward the bottom surface (116) of the base (110).

8. The system (100) of claim 1 further comprising a first tie-down hole (172*a*) disposed in the side wall (111) of the base 110 at or near the bottom surface (116) or lip (140).

9. The system (100) of claim 8 further comprising a second tie-down hole (172*b*) disposed in the side wall (111) of the base (110) at or near the bottom surface (116) or lip (140), the second tie-down hole (172*b*) is positioned opposite the first tie-down hole (172*a*).

\* \* \* \* \*